No. 611,336. Patented Sept. 27, 1898.
A. J. SCHINDLER.
MACHINE FOR WORKING OFF KEGS OR BARRELS.
(Application filed Dec. 22, 1893.)
(No Model.)
4 Sheets—Sheet 2.

Witnesses:
Chas. E. Gaylord,
Lite B. Alter.

Inventor:
A. J. Schindler,
By L. B. Coupland & Co.
Attys.

THE NORRIS PETERS CO., PHOTO-LITHO., WASHINGTON, D. C.

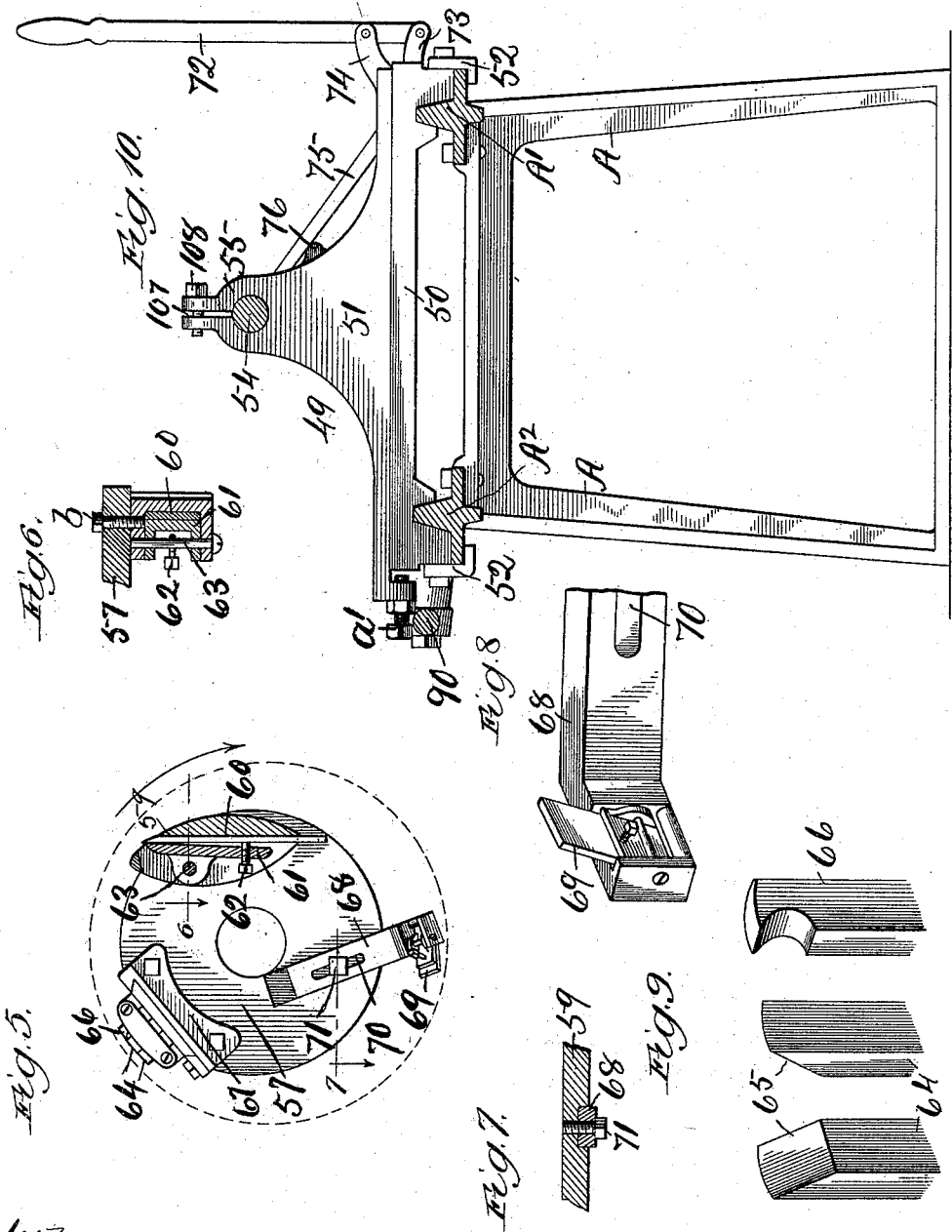

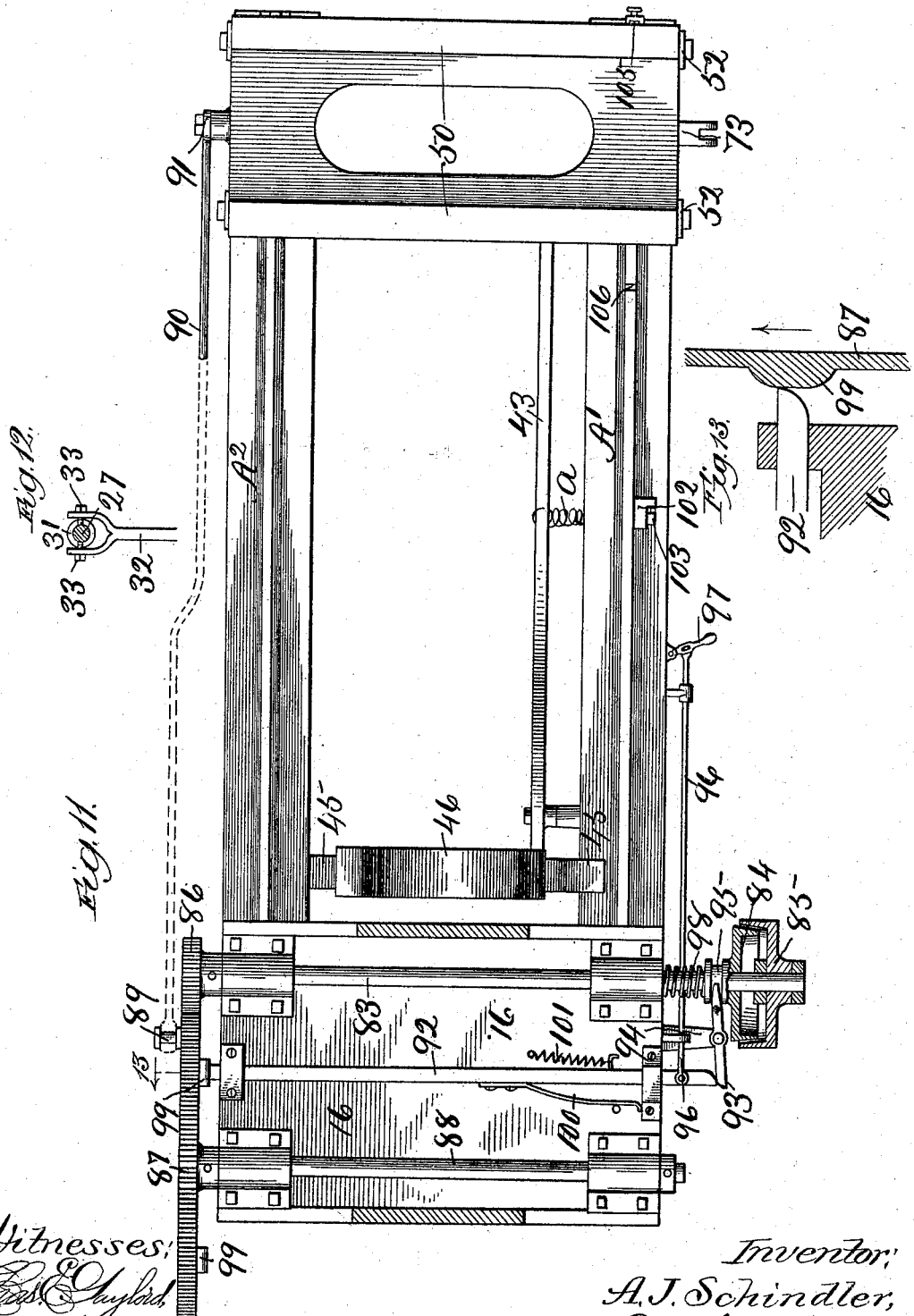

UNITED STATES PATENT OFFICE.

ANDREW J. SCHINDLER, OF CHICAGO, ILLINOIS.

MACHINE FOR WORKING OFF KEGS OR BARRELS.

SPECIFICATION forming part of Letters Patent No. 611,336, dated September 27, 1898.

Application filed December 22, 1893 Serial No. 494,419. (No model.)

*To all whom it may concern:*

Be it known that I, ANDREW J. SCHINDLER, a citizen of the United States, residing at Chicago, in the county of Cook and State of Illinois, have invented certain new and useful Improvements in Machines for Working Off Kegs or Barrels, of which the following is a full, clear, and exact description, that will enable others to make and use the same, reference being had to the accompanying drawings, forming a part of this specification.

This invention relates to improvements in that class of machines used in howeling, chamfering, and crozing in the art of coopering, and has for its object to provide a machine of this character whereby both ends of the work are operated upon simultaneously, the same consisting of certain novel features in the construction, combination, and operation, as will be hereinafter set forth.

Figure 1:
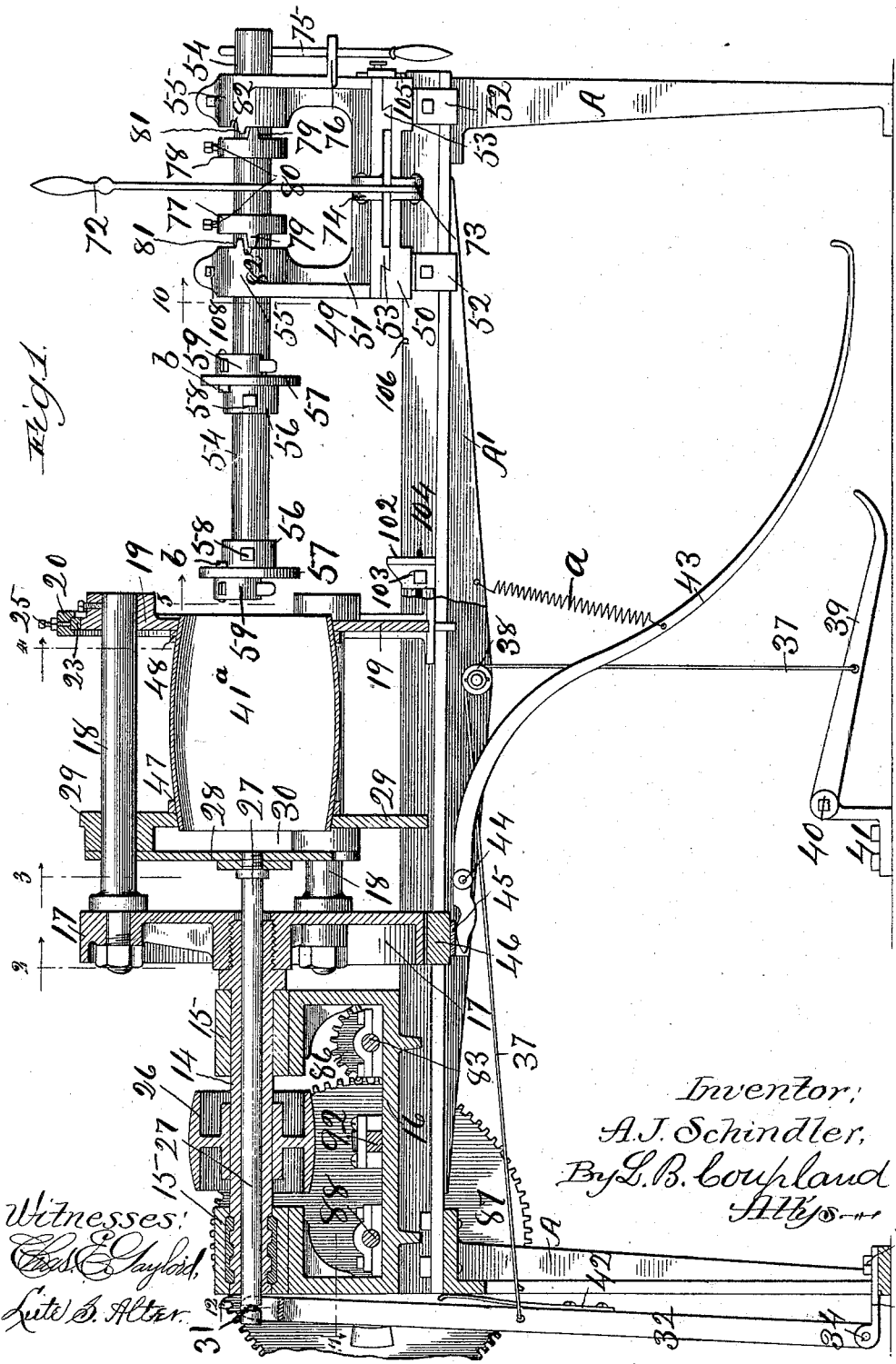
Figure 2:
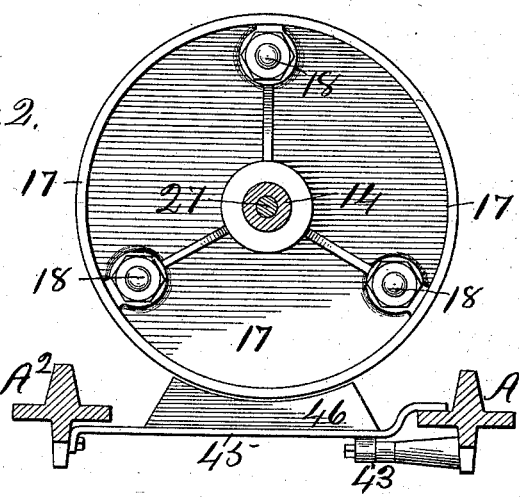
Figure 3:
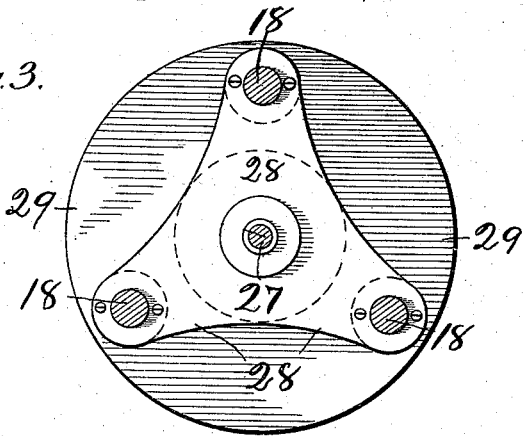
Figure 4:
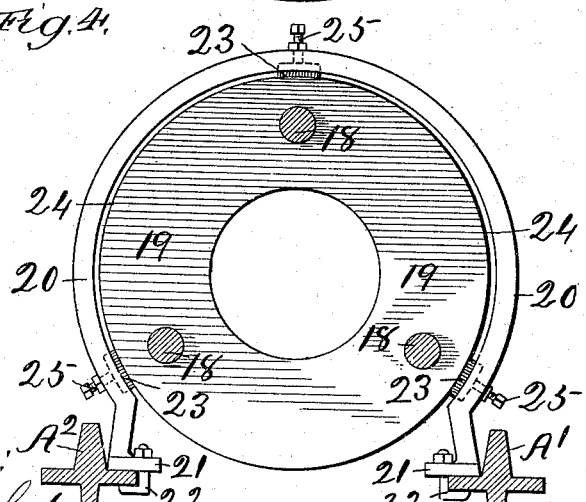

In the drawings, Figure 1 is a front side elevation and part longitudinal section; Fig. 2, a transverse section on line 2, Fig. 1, looking in the direction indicated by the arrow; Fig. 3, a transverse section on line 3, Fig. 1; Fig. 4, a transverse section on line 4, Fig. 1. Fig. 5 is an end elevation of the tool-carrying shaft, taken on line 5, Fig. 1, showing in dotted line a portion of the barrel; Fig. 6, a broken-away section on line 6, Fig. 5; Fig. 7, a sectional detail on line 7, Fig. 5; Fig. 8, a broken-away view in perspective of the chamfering-tool; Fig. 9, a broken-away detail of a set of crozing-tools, showing the working ends; Fig. 10, a transverse section on line 10, Fig. 1; Fig. 11, a longitudinal horizontal section on line 11, Fig. 1; Fig. 12, a broken-away sectional detail on line 12, Fig. 1; and Fig. 13, a broken-away sectional detail on line 13, Fig. 11.

The supporting-frame comprises the end parts A A and the horizontal connecting side rails A' A².

The mechanism for clamping and rotating the work will be first described.

At one end of the machine is located a revoluble hollow shaft 14, provided with suitable journal-bearings 15, forming a part of a bed-plate 16, rigidly fastened to the frame. A face-plate 17 is rigidly mounted on the inner end of the hollow shaft. A number of horizontal drivers 18 have their rear ends fixed in the face-plate 17. These drivers are arranged at intervals, Figs. 1, 2, 3, and 4, and extend some distance in the direction of the front end of the machine and have a clamping or work-holding chuck-ring 19, Fig. 4, adjustably mounted on the front ends. This ring is partially surrounded by an open ring 20, forming a steady-rest for this part of the machine. The ends of ring 20 terminate in lugs 21, through which are inserted hook clamping-bolts 22, which engage with the under inner edge of the framing-bars and provide for a sliding movement of the steady-rest with reference to the adjustment of the chuck-ring. This chuck-ring is adapted to have a sliding adjustment on the drivers for the purpose of accommodating kegs or barrels of different lengths and after being adjusted to proper position for barrels of given length is clamped and held by the clamping-ring 20. A number of bearing-gibs 23 are arranged at intervals in the annular space 24 between the chuck-ring 19 and its steady-rest, as shown in Fig. 4. These bearings are adjusted by means of set-screws 25 to compensate for the wear and hold the rotating ring in a central position. A driving-pulley 26 is mounted on the hollow shaft and receives the belt from the motive power.

A spindle or solid shaft 27 is inserted through the hollow shaft and is adapted to have both a rotary and an endwise movement. A plate 28 is fixed on the inner end of the spindle 27. This plate is secured to the outer side, Figs. 1 and 3, of a second chuck-ring 29, which supports the opposite end of the work from that of the companion ring 19. The chuck-ring 29 is loosely mounted on the drivers 18, so as to have a sliding movement thereon—that is, toward and away from the work—coincident with the endwise movement of spindle 27.

The space 30, Fig. 1, between the plate 28 and the chuck-ring 29 provides room for such of the cutting-tools as may project a little beyond the end of the work.

The outer end of spindle 27 is provided with an annular groove 31, Figs. 1 and 12, and is embraced at that point by the upper bifurcated end of lever 32, having bearing-pins 33 inserted therethrough from opposite sides and ending in said groove. The lower end of this lever is pivoted at 34 to an arm 35, bolted to the base part of the frame, as at 36. A cord 37 is connected to this lever at a point near its longitudinal center and extends backward to and downward over a roller 38 and is connected to a foot lever or treadle 39, pivoted at 40 to a fixed bracket 41. The spindle 27 is now at its inner position, a keg 41ª being clamped in place ready to be operated upon. The inward movement of the spindle is secured by pressing down on the foot-lever. When the pressure on the foot-lever is relaxed, the spindle is automatically returned to its outward or normal position by means of a spring 42, secured at one end to the vertical lever 32, the tension end bearing loosely against the end of the frame. A foot-lever 43 is pivoted to the frame, as at 44, Figs. 1 and 2, and bears against the under side of a flat bar 45, on which is fixed a brake-shoe 46. One end of bar 45 is bolted to one side of the frame, the other end resting loosely on the opposite side of the frame. This brake-shoe is located underneath the face-plate 17 and is adapted to have frictional contact with the periphery thereof when a downward pressure is applied to the foot end of lever 43. This brake-lever is returned to and held in its normal position by a spring $a$, the brake-shoe dropping down out of contact when the pressure on the under side is relaxed. The object of this brake attachment is to quickly arrest the motion of the machine, so that the work can be inserted and removed with facility without the loss of any unnecessary time.

The operation of inserting and removing the work is as follows: Normally the chucking 29 is back out of contact. When the work is inserted, the chuck 29 is moved forward into a clamping position by pressing down on lever 39, which, through its connections before described, imparts an inward endwise movement to spindle 27 until the chucking 29 shoulders against the truss-hoop 47 on the work. The truss-hoop 48 provides a shoulder-stop for the opposite end. The work, as illustrated in Fig. 1, is in place to be operated upon by the working-off tools, which will be next described. A traveling carriage 49, consisting of bed-plate 50 and a bracket-stand 51, is mounted on one end of the frame. The bed-plate has a sliding movement in the direction of and away from the work and is held against being raised from its seat by means of a number of hook-plates 52, bolted thereto and projecting down under the respective side edges of the frame, as shown in Fig. 10. The bracket-stand is seated loosely on the bed-plate and has a dovetailed engagement 53 therewith, Fig. 1, which provides for a lateral movement of the stand and also locks the same against being raised upwardly.

A tool-carrying shaft 54 is supported in bearings 55 of the bracket-stand. Shaft 54 can be moved to a position eccentric to shaft 27 and to a barrel concentric with said shaft. As shown in Figs. 1 and 5, the axis of the cutter-head 57, which head is carried by shaft 54, is above the axis of the shaft 27. As the bearings of the shaft 54 are supported in a movable frame, this eccentric relation of shafts 27 and 54 may be varied. Shaft 54 supports the cutter-head 57. This shaft does not have a rotary action, but only a slight rocking hand movement in bringing the different tools into a cutting position. The cutting-tools are mounted on that part of the shaft 54 projecting in advance of the traveling carriage.

There are two tool-carrying cutter-heads, which are arranged to operate on both ends of the work simultaneously. These being duplicates a description of one will answer for both, the same reference characters being used on duplicate parts.

A collar 56, provided with a flange 57, is adjustably secured on shaft 54 by a set-screw 58. A tool-holding head 59, Figs. 1 and 5, is secured to the flange 57 of collar 56 by a number of bolts $b$, Fig. 6. It will be understood that the heads 59 are constructed so as to afford access for the adjustment of the different tools.

The howeling-tool consists of the cutting-bit 60, Figs. 5 and 6, and the wedge 61, through which the adjusting-screw 62 is inserted. The wedge part is secured to the head 59 by a bolt 63.

The crozing device consists of three distinct tools, which are arranged in the relative order illustrated in Figs. 5 and 9. The two bits 64 have beveled cutting ends 65 and cut out two scores and are set in advance of the cutting-bit 66, which cuts out and forms the required groove between the two scores. These bits are fixed in a plate 67, which is bolted to the flange 57, as shown in Fig. 5.

The chamfering device consists of the angular stock 68 and the cutting-bit 69, secured thereto in any suitable manner. The stock is provided with an elongated slot 70, through which is inserted a bolt 71, adjustably securing the stock to the carrying-head.

The howeling and the crozing tools are mounted, respectively, at opposite sides of a vertical line passing through the shaft 54, so that they are thrown into and out of action alternately by lateral movements of the bracket-stand 51 in opposite directions, and the chamfering-tool is mounted approximately midway between said howeling and crozing tools on the line of greatest eccentricity, so that by rocking the shaft the said tool is thrown into and out of action.

Normally the tool-carrying shaft enters the work at one side of the center to hold the cutters out of contact, as shown in Fig. 5, the dotted circle representing a keg or barrel and the arrow the direction of rotation. This is the relative position when the lever 72 is in the vertical position shown in Fig. 10. The lower end of this lever is pivoted to a fulcrum-lug 73, formed on the bed-plate 50. A link 74 connects this lever and the bracket-stand 51 of the traveling carriage. Now by moving this lever away from the machine a corresponding movement is imparted to the bracket-stand supporting the tool-carrying shaft and has the effect of bringing the howeling or leveling tool in contact with the work. Moving lever 72 in the opposite direction throws the howeling-tool out of contact and moves the crozing-tool into a cutting position. The outward movement of the lever 72 and of the bracket-stand is limited by means of a gage-screw $a'$.

A hand-lever 75 is secured to the outer end of the tool-carrying shaft and normally rests against a stop 76, formed on the adjacent part of the bracket-stand. On the tool-carrying shaft, between the two bearings, are mounted collars 77 and 78, each of which is provided with a cam projection 79, Fig. 1, and adapted to be adjusted angularly on the shaft and to be fixed in any position they may be adjusted to by set-screw 80. The adjacent sides of the bearings are provided with cam projections 81 and recesses 82. These cams are beveled somewhat, so that when the shaft is turned they will have a wedging action, slipping past each other and imparting a slight longitudinal movement to the tool-carrying shaft. The coacting projections on the respective collars and bearings are so arranged relatively to each other that when the projection on one collar (78, for instance) strikes that on the adjacent bearing the shaft will be moved longitudinally in one direction, the projection on the other collar then entering the notch or recess 82, when the shaft is locked. A reverse movement forces the shaft back to an intermediate position, in which it remains until the projection on collar 77 strikes the projection 81, when it is moved a step farther longitudinally, the projection on collar 78 then entering its notch and the shaft again becoming locked. Under the arrangement shown in Fig. 1 practically a full rotation of the shaft is required to effect its longitudinal movement from one extreme position to the other; but it is evident that the collars 77 and 78 may be so adjusted and the notches 81 so located relatively to each other that the longitudinal movement may be effected by partial rotations back and forth. When the chamfering-cutter is to be moved into a cutting position, it is done by turning the tool-shaft part way around by means of hand-lever 75, which brings the cutter into the narrowing space of the eccentric circle and in contact with the work, the wedge-points at the same time imparting a slight longitudinal movement to the tool-shaft, by which the chamfering-cutters are fed to the work, and engaging with recesses 82 when the shaft has been rotated far enough and locking the same at that point until rotated back to the normal position shown in Fig. 1. Thus the howeling and crozing tools are controlled and manipulated by hand-lever 72 and the chamfering-tool by hand-lever 75.

Mechanism for automatically transmitting the required movement to the traveling carriage will be described next.

A transverse shaft 83, Fig. 11, is journaled in bearings on bed-plate 16. On the end of this shaft projecting beyond the front side of the machine are mounted the ordinary friction clutch members 84 and 85. On the opposite end is mounted a pinion 86, which engages with a crank gear-wheel 87, mounted on shaft 88, also journaled in bracket-plate 16. A pin 89 is inserted in gear-wheel 87 and has one end of a rod 90 connected thereto. The opposite end of connecting-rod 90 is connected to bed-plate 50, as at 91. A cross-bar 92 is secured in bearings on bed-plate 16 and is adapted to have an endwise movement and a lateral movement at the front end in engaging or disengaging the clutch driving mechanism. A lever 93 is pivoted to the outer end of an arm 94. The fork end of this lever engages with a grooved collar 95, formed on the clutch member feathered on shaft 83. The opposite end of lever 93 has a loose contact with the end of bar 92. A rod 96 has one end attached to this end of bar 92, and from thence runs along and is supported from the frame to a point convenient for the operator and is provided with a handle 97, adapted to impart an endwise movement to said rod and a lateral movement to the bar 92 to clear the end of the lever 93, when the clutch member 84 will be thrown into engagement with member 85 by a spring 98, coiled on the clutch-shaft, which in rotating transmits motion to gear-wheel 87, and the traveling carriage, carrying the tool-holding shaft, is moved forward to bring the tools into a working position. When the gear-wheel has made one-half of a revolution, the carriage has reached its innermost position. The motion is then arrested by one of the cam-lugs 99, Figs. 11 and 13, formed on the gear-wheel, which, coming in contact with the end of cross-bar 92, imparts an endwise movement thereto and, bearing against the end of lever 93, throws the clutch mechanism out of engagement. The traveling carriage is returned to its normal position in the same manner, the gear-wheel making a half-revolution with each movement. A spring 100 retains the cross-bar in its normal position against a lateral movement and a spring 101 retains the bar normally against gear-wheel 87. This arrangement for mechanically moving the tool-supporting carriage is more especially intended for the larger work, such as barrels. For small kegwork, where the movement of the carriage is very limited, it can be moved back and forth by hand with advantage. By disconnecting the rod connecting the driving-gear and carriage the automatic feature will remain at rest. In small special machines the automatic feature may be entirely omitted.

When the tool-carrying carriage is shifted by hand, an adjustable gage-stop 102 limits the forward movement thereof to a fixed position. This stop is secured to the frame by a bolt 103 and is adapted to have a longitudinal adjustment with reference to the frame by means of slot 104. A latch-bolt 105 is so cured to the carriage and engages with notch 106 in the frame and locks the carriage in its working position when being moved by hand.

The bearings 55 are provided on top with slotted openings 107 and have clamping-screws 108 inserted therethrough, which provide means for easing or tightening up on said bearings, as may be necessary.

The cutter-heads, as shown, carry the howeling, crozing, and chamfering tools or cutters; but it is obvious that should the work require it any number, more or less, may be employed.

A number of chuck-rings of different sizes are provided for each machine, so as to accommodate work of different diameters.

By the ordinary arrangement but one end of a keg or barrel is worked off at a time, the work being taken out, turned end for end, and replaced in the machine. By means of the arrangement herein set forth both ends are operated upon at the same time, which is a very important advantage in saving both time and labor and doing double the amount of work.

Having thus described my invention, what I claim as new, and desire to secure by Letters Patent, is—

1. In a machine of the character described the combination with the frame, of a tool-carrying shaft mounted in bearings on the frame, companion collars on the shaft adjacent to the respective bearings, oppositely-extending cam projections on the bearings extending into the paths of the projections on the collars, and notches in the bearings adapted to receive the last-named projections, the relative arrangement of projections and notches being such that when the shaft is rotated in either direction the projection on one collar coacting with the projection on the adjacent bearing will automatically move the shaft endwise, the projection on the other collar entering the notch in the bearing adjacent thereto.

2. In a barrel-machine, and in combination, the barrel-clamping mechanism, means for rotating the barrel on its axial center while in the clamps, a tool-carrying shaft supported on a carrier so as to enter said barrel longitudinally and in a line eccentric to the barrel-axis, and a chamfering-tool carried by said shaft projecting radially from the shaft a distance exceeding the radius of the barrel, but less than the barrel-radius plus the eccentricity of arrangement of shafts, and means for rocking the tool-shaft and holding it in rocked position, whereby the chamfering-tool may be passed entirely through the barrel, then rocked into position to engage the end thereof, and held while the rotation of the barrel effects the chamfering, substantially as described.

3. In a barrel-machine, the combination of suitable mechanism for clamping and rotating the barrel, a tool-carrying shaft supported eccentrically to the axis of the clamped barrel, a plurality of tools on said tool-shaft, one of said tools projecting radially to a greater distance than the radius of the barrel, but less than the barrel-radius plus the eccentricity of arrangement of shafts, means for moving the shaft lengthwise so that this tool may pass entirely through the barrel, and by the rocking of the shaft be brought in alinement with the barrel end, and means for traversing the tool-shaft laterally, substantially as described.

4. In a barrel-machine, the barrel clamping and rotating mechanism, the tool-shaft arranged eccentrically to the axis of the barrel, the tool-support on said shaft having the crozing and howeling cutters arranged at nearly-opposite sides of the shaft and in position to be brought into operative position by the lateral movement of the shaft, and the chamfering-tool projecting radially from the shaft a distance greater than the radius of the barrel, but less than the barrel-radius plus the eccentricity of arrangement of shafts, and means for advancing, traversing, and rocking the tool-shaft in manner specified, all substantially as described.

5. In a barrel-machine suitable barrel clamping and rotating mechanism, a tool-carrying shaft supported eccentrically to the axis of the clamped barrel, two cutter-carrying heads arranged on said tool-shaft, each carrying a chamfering-cutter projecting radially from the shaft to a distance greater than the radius of the clamped barrel, but less than the barrel-radius plus the eccentricity of arrangement of shafts, means for advancing the tool-shaft to carry one of the chamfering-tools through the barrel in its described eccentric relation, means for rocking the shaft to bring the cutters into operative position, and automatic mechanism imparting the slight longitudinal movement to the shaft to shift the cutters alternately to working position, all combined substantially as described.

6. In a barrel-machine, the barrel clamping and rotating mechanism, the longitudinally-traveling carriage and means for traversing it, the bracket-stand on said carriage arranged for lateral movement thereon, the tool-carrying shaft on said stand having cutter-carrying heads for each end of the barrel, means for rocking said shaft and for holding it in rocked position, and automatic mechanism substantially as described whereby the shaft is slightly shifted lengthwise to bring the chamfering-tools to working position all combined substantially as described.

ANDREW J. SCHINDLER.

Witnesses:
L. M. FREEMAN,
L. B. COUPLAND.